United States Patent
Tuccio

(10) Patent No.: US 11,931,848 B2
(45) Date of Patent: Mar. 19, 2024

(54) HIGH-SPEED, LOW RUNOUT SPINDLE ASSEMBLY

(71) Applicant: ZIPPY ROBOTICS, INC., Northport, NY (US)

(72) Inventor: Rocco J. Tuccio, Northport, NY (US)

(73) Assignee: ZIPPY ROBOTICS, INC.

( * ) Notice: Subject to any disclaimer, the term of this patent is extended or adjusted under 35 U.S.C. 154(b) by 0 days.

(21) Appl. No.: 17/405,187

(22) Filed: Aug. 18, 2021

(65) Prior Publication Data
US 2022/0056951 A1 Feb. 24, 2022

Related U.S. Application Data

(60) Provisional application No. 63/067,894, filed on Aug. 20, 2020.

(51) Int. Cl.
| | |
|---|---|
| *B23B 31/28* | (2006.01) |
| *B23B 31/00* | (2006.01) |
| *B23Q 1/70* | (2006.01) |
| *B23Q 5/10* | (2006.01) |
| *F16C 19/54* | (2006.01) |

(52) U.S. Cl.
CPC .............. *B23Q 5/10* (2013.01); *B23B 31/005* (2013.01); *B23Q 1/70* (2013.01); *F16C 19/54* (2013.01); *F16C 2322/39* (2013.01)

(58) Field of Classification Search
CPC . B23Q 1/70; B23Q 3/12; B23Q 3/186; B23Q 5/10; B23B 31/005; B23B 31/28; B23B 31/02; B23B 2260/008; B23B 2260/10; B23B 2233/12
See application file for complete search history.

(56) References Cited

U.S. PATENT DOCUMENTS

| | | | | |
|---|---|---|---|---|
| 1,201,363 | A * | 10/1916 | Shelton | A61C 1/06 475/196 |
| 1,326,863 | A * | 12/1919 | Heinkel | B23C 3/00 408/124 |
| 2,972,485 | A * | 2/1961 | Ferchland | B23B 31/28 335/295 |

(Continued)

FOREIGN PATENT DOCUMENTS

| | | | |
|---|---|---|---|
| CN | 2289343 Y | * | 8/1998 |
| DE | 631097 A5 | * | 7/1982 |

(Continued)

OTHER PUBLICATIONS

CN-2289343-Y Machine Translation (Year: 2023).*

(Continued)

*Primary Examiner* — Nicole N Ramos
(74) *Attorney, Agent, or Firm* — DP IP GROUP; Franco S. De Liguori

(57) ABSTRACT

A high-speed low runout spindle assembly is provided. The spindle assembly includes a friction drive wheel configured to be coupled to an output shaft of a motor. The friction drive wheel is configured and disposed to directly contact a shank of a bit. A set of bearings is configured to contact the shank of the bit. A bit clamp assembly includes a clamp bearing having a central through-hole dimensioned to accept a lower portion of the shank of the bit. The bit clamp assembly is configured to hold the bit in contact with the set of bearings.

17 Claims, 8 Drawing Sheets

(56) References Cited

U.S. PATENT DOCUMENTS

| | | | | |
|---|---|---|---|---|
| 3,101,542 A * | 8/1963 | Fodor | .................... | A61C 1/185 |
| | | | | 408/127 |
| 4,071,029 A * | 1/1978 | Richmond | ......... | A61B 17/1662 |
| | | | | 433/105 |
| 4,260,301 A * | 4/1981 | Reiman | ................ | B23B 39/163 |
| | | | | 408/47 |
| 4,322,186 A * | 3/1982 | Boling | .................... | F16D 43/20 |
| | | | | 408/139 |
| 4,378,212 A * | 3/1983 | Waldron | .................. | A61C 1/14 |
| | | | | 279/93 |
| 4,655,616 A * | 4/1987 | Ducan | .................... | F16C 25/08 |
| | | | | 310/90 |
| 5,195,853 A * | 3/1993 | Dooley | ................. | B23Q 5/402 |
| | | | | 408/124 |
| 5,569,256 A * | 10/1996 | Vaughn | ............ | A61B 17/32002 |
| | | | | 279/75 |
| 5,597,275 A * | 1/1997 | Hogan | ................ | B25B 23/0035 |
| | | | | 408/239 R |
| 5,710,474 A * | 1/1998 | Mulgrave | ............. | H02K 29/08 |
| | | | | 310/85 |
| 5,810,828 A * | 9/1998 | Lightman | ............. | B23B 49/008 |
| | | | | 606/80 |
| 5,823,774 A * | 10/1998 | Abbott | ..................... | A61C 1/08 |
| | | | | 433/116 |
| 6,568,869 B1 * | 5/2003 | Murata | .................. | B62D 57/02 |
| | | | | 446/129 |
| 9,743,995 B2 * | 8/2017 | Lohmeier | .............. | A61B 34/71 |
| 2002/0072033 A1 * | 6/2002 | Bierbaum | ................ | A61C 1/06 |
| | | | | 433/105 |
| 2004/0051256 A1 * | 3/2004 | Ayrton | ............. | B23B 31/16037 |
| | | | | 279/4.01 |
| 2013/0154205 A1 * | 6/2013 | Santamarina | ....... | B25B 23/0035 |
| | | | | 74/416 |
| 2015/0052720 A1 * | 2/2015 | Weyland | .................. | B21J 15/36 |
| | | | | 403/349 |
| 2015/0343582 A1 * | 12/2015 | Ebihara | .................. | B23B 31/28 |
| | | | | 279/128 |

FOREIGN PATENT DOCUMENTS

| | | | | |
|---|---|---|---|---|
| EP | 0775546 | B1 | * | 7/2000 |
| GB | 191300630 | A | * | 6/1913 |
| GB | 284471 | A | * | 2/1927 |
| GB | 1111390 | A | * | 4/1968 |
| JP | 2001328014 | A | * | 11/2001 |

OTHER PUBLICATIONS

EP-0775546-B1 Machine Translation (Year: 2023).*
JP-2001328014-A Machine Translation (Year: 2023).*
CH-631097-A5 Machine Translation (Year: 2023).*

* cited by examiner

HIGH-SPEED, LOW RUNOUT SPINDLE ASSEMBLY

CROSS-REFERENCE TO RELATED APPLICATION

This application claims priority to U.S. Provisional Patent Application No. 63/067,894, filed on Aug. 20, 2020, which is incorporated herein by reference in its entirety.

BACKGROUND

Technical Field

The present invention relates to spindles for computerized numerical control (CNC) machines, and more particularly to a high speed, low runout spindle for small diameter end mills used in CNC machines.

Background Information

A generic, hobby spindle of the type used in consumer-grade desktop CNC machines for cutting wood can have a radial runout of 1 to 5 mils (0.001 to 0.005 inches). However, with an end mill diameter of only 5-mils, as would be necessary for fine detail milling, runout of 1 to 5 mils will likely cause the end mill to snap on contact with the material in the worst case, or in the best case suffer from uneven load on the end mill's teeth and rapid wear, leading to a significantly reduced lifetime, to the point where little useful work can be done with the end mill.

Commercial options for high speed, low runout spindles exist, however, these options can be quite expensive. Moreover, even these high speed, low runout spindles may not have a static runout that is as low as 0.0001-inch.

SUMMARY

According to an aspect of the present invention, a high-speed low runout spindle assembly is provided. The spindle assembly includes a friction drive wheel configured to be coupled to an output shaft of a motor. The friction drive wheel is configured and disposed to directly contact a shank of a bit. A plurality of bearings is configured to contact the shank of the bit. A bit clamp assembly includes a clamp bearing having a central through-hole dimensioned to accept a lower portion of the shank of the bit. The bit clamp assembly is configured to hold the bit in contact with the plurality of bearings.

According to another aspect of the present invention, a high-speed low runout spindle assembly is provided. The spindle assembly includes a friction drive wheel configured to be coupled to an output shaft of a motor. The friction drive wheel is configured and disposed to directly contact a shank of a bit. The spindle assembly also includes a set of bearings arranged in a triangular configuration and forming a central void therebetween. The set of bearings includes a first bearing, a second bearing and a third bearing. The first bearing is mounted on a moveable post. The set of bearings is configured to contact the shank of the bit along outer races of the first bearing, second bearing, and third bearing. A biasing spring is attached to the moveable post. The biasing spring is configured to move the first bearing towards the second bearing and the third bearing. A bit clamp assembly includes a clamp bearing having a central through-hole dimensioned to accept a lower portion of the shank of the bit. The bit clamp assembly is configured to hold a depth ring of the bit in contact with the bit clamp bearing.

According to yet another aspect of the present invention, a high-speed, low runout spindle assembly is provided. The spindle assembly includes a friction drive wheel configured to be coupled to an output shaft of a motor. The friction drive wheel is configured and disposed to directly contact a shank of a bit. An upper bearing and a lower bearing are arranged coaxially along a vertical direction and are configured to contact the shank of the bit. A central bore of the upper bearing and a central bore of the lower bearing are aligned and dimensioned to accept the shank of the bit. A bit clamp assembly includes a clamp bearing having a central through-hole dimensioned to accept a lower portion of the shank of the bit. The bit clamp assembly is configured to hold the bit in contact with the upper bearing and the lower bearing. A housing encloses the friction drive wheel and the upper bearing and the lower bearing. The housing includes a first magnet and a second magnet configured to magnetically couple with respective magnets disposed on a top surface of the bit clamp assembly. The first magnet and the second magnet are coupled to respective compression springs configured to apply an upward force to securely hold the bit clamp assembly and pre-load the lower bearings.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
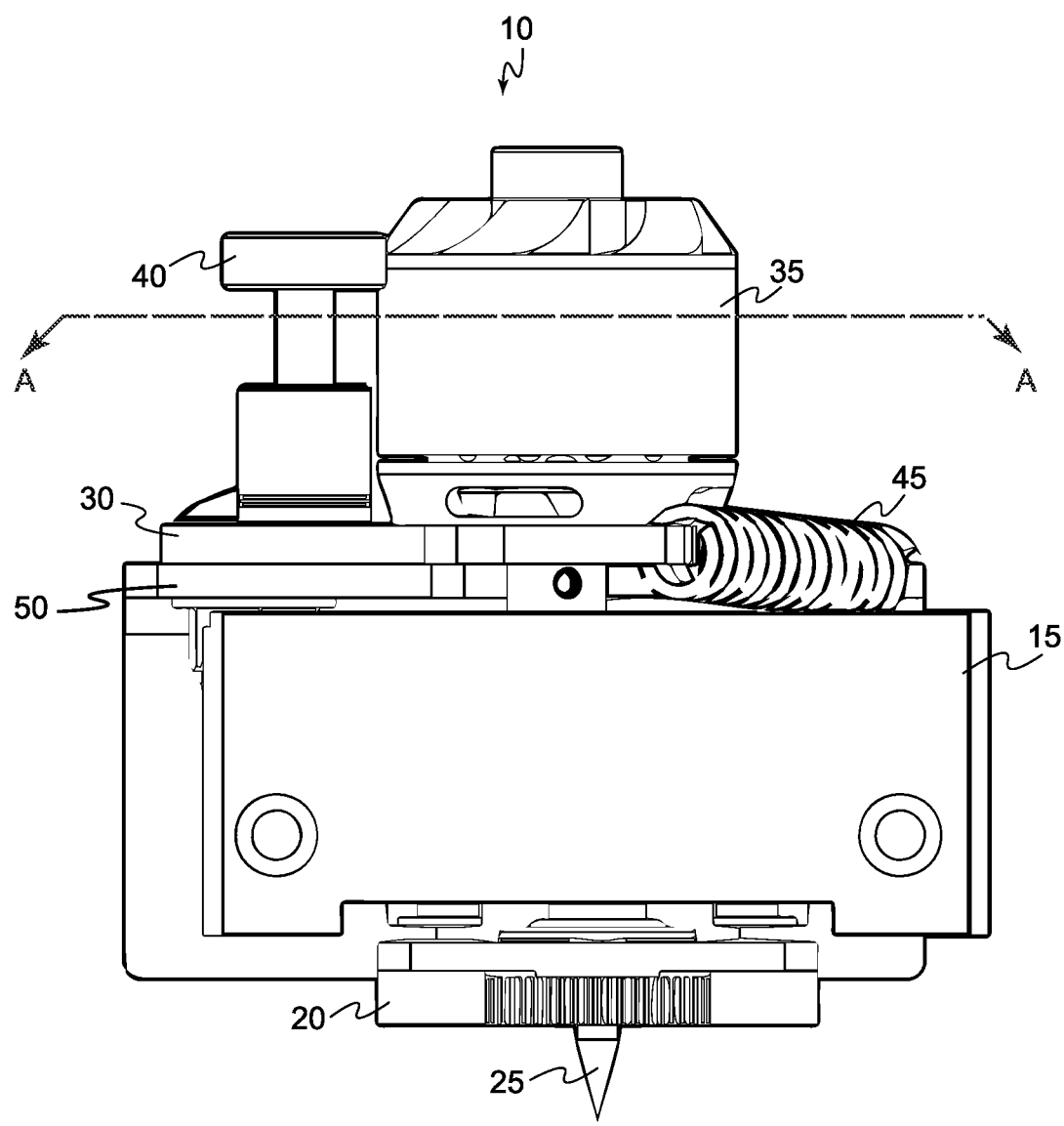
FIG. 1 is a front view of a spindle assembly, in accordance with an embodiment of the present invention.

Some embodiments of the present invention can have static run-outs of about 0.0001 inches and be manufactured at a much-reduced cost. While commercial solutions provide high load capacities during milling and drilling, this is not a factor for applications such as printed circuit board (PCB) milling where the engraving is just a few thousandths of an inch into the material.

Embodiments of the present invention, unlike conventional spindles, hold bits, such as end mills and drill bits, for example, without using a collet or other chuck assemblies. Instead, the end mill or drill bit can be inserted directly through the inner bore of the bearings. It is generally understood that end mills are used for routing while drill bits are used for drilling. However, within the context of the present invention the term "bit" is used to encompass all such rotating cutting tools, and thus the use of one term or the other hereinafter should not be construed to limit the so-referred component to only an end mill, drill bit, or other forms of rotating cutting tools.

The bit can be secured axially by a depth ring secured to the bit shank and the clamp bearing from below, and the lower spindle bearing from above. The bit clamp can be magnetic, and couples to plungers in the spring housing. In some embodiments the plungers magnetically "grab" the bit clamp when the bit clamp is brought near, and springs in the plungers pull the bit clamp towards the spindle block, applying a force that works with the internal preload to properly preload all bearings.

Applications such as machine tool spindles require precision rotary motion with a higher degree of stiffness and positional accuracy. To achieve this, a sustained load can be applied to the bearings to remove excess play. This is referred to as preloading the bearing. Along with the elimination of clearances, preloading also increases the stiffness of the assembly, improves rotational accuracy and decreases noise caused by vibration or resonance. Additionally, preloading eliminates skidding of rolling elements of the bearings, and keeps the rolling elements in the proper location in the bearing. Moreover, in high speed milling vibrations within the spindle assembly can cause the bit to wear out quickly and/or break.

The amount of preload applied is important. It must be sufficient to reduce the excess play, but care must be taken not to apply too much preload. Proper preload allows the rolling elements to freely rotate in the bearing races, while excessive preload can lead to skidding. This will increase friction and heat generation, which can ultimately lead to premature bearing failure. Thus, in embodiments of the present invention the springs in the plungers can be selected based on an appropriate spring constant to provide sufficient preloading to the bearings.

The bit is driven by a drive wheel, which rotates the bit by friction on the shank. In this way, bit replacement can be facilitated without the use of tools, such as screwdrivers or wrenches, for example, which significantly reduces the time for bit replacements as compared to using two wrenches that an ER collet system requires, or the screwdrivers needed in some prior art milling machines. Additionally, prior art collet-less milling machines do not address preloading the spindle bearings, which is necessary for longer bearing lifetime.

Figure 2:
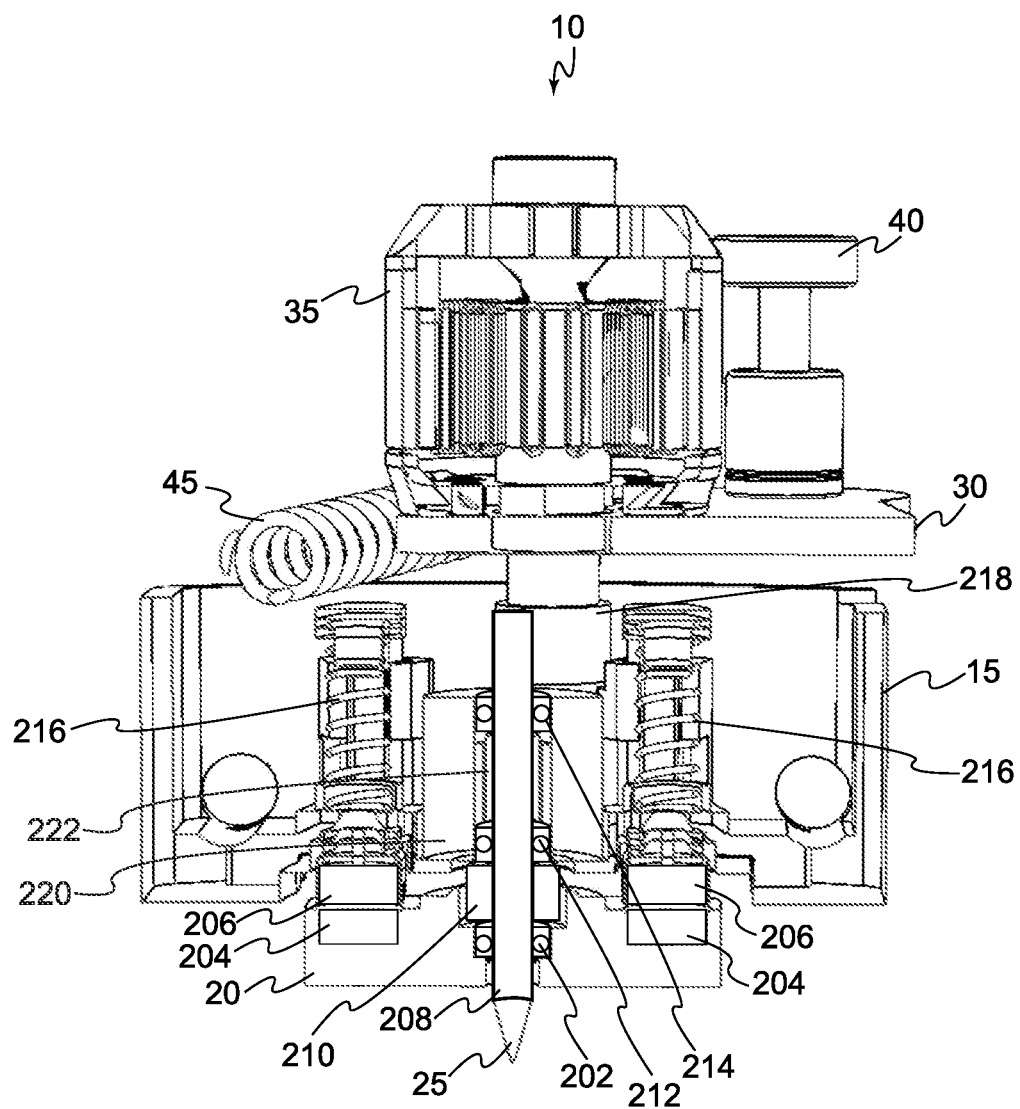
FIG. 2 is a cross-sectional elevation view taken along the line A-A of the spindle assembly of FIG. 1.
Figure 3:
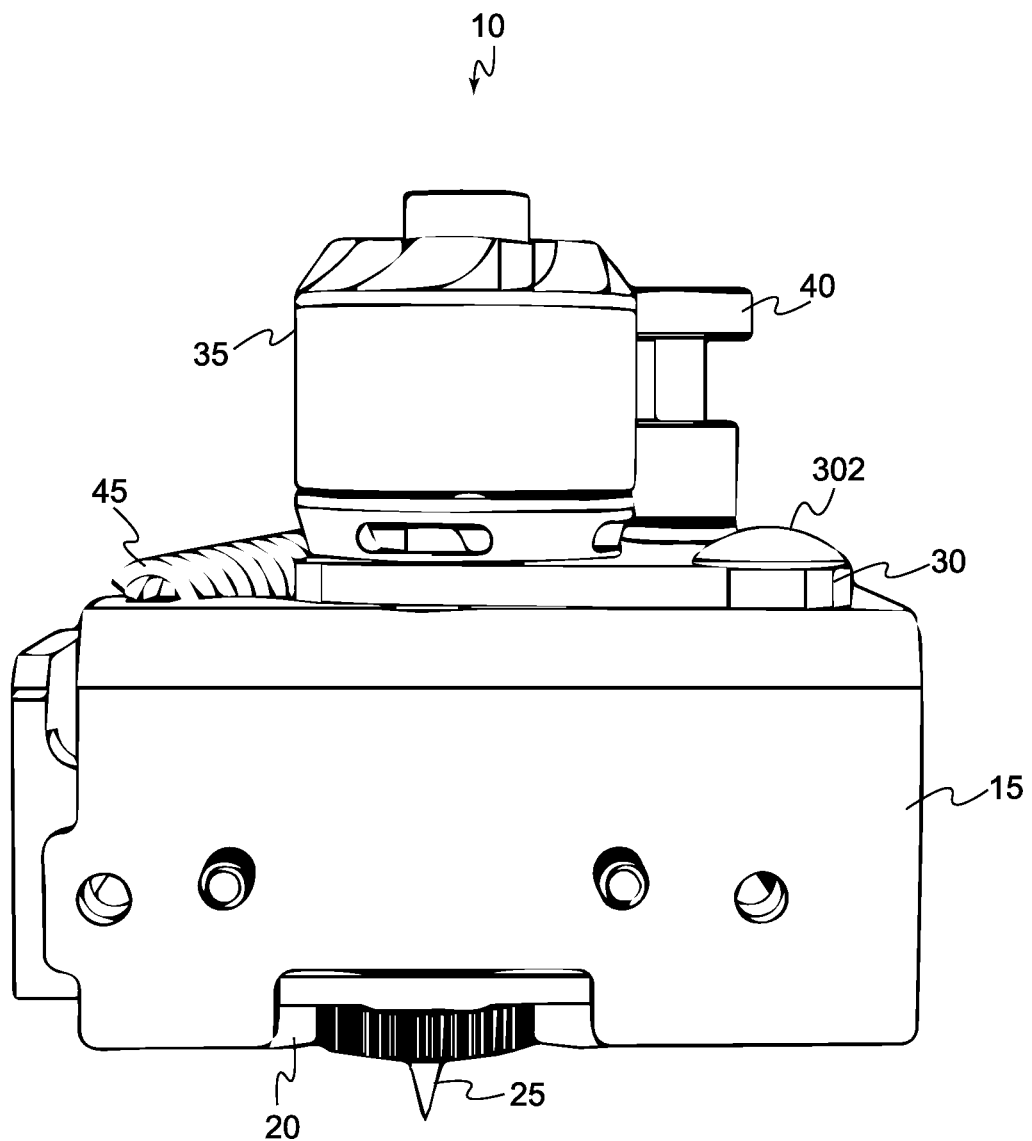
FIG. 3 is a rear view of the spindle assembly of FIG. 1.

FIG. 1 shows a front view of an embodiment of a high speed, low runout spindle assembly 10 in accordance with the present invention. FIG. 2 is a cross-sectional view taken along the line A-A in FIG. 1. FIG. 3 shows a rear view of the spindle assembly 10 shown in FIG. 1. A motor swivel plate 30 includes a spring-loaded pin 40 that is captured by a hole (not shown) in a spindle bracket 50 to keep a spindle motor 35 and a motorized friction drive wheel 218 (shown in FIG. 2) disengaged from a shank 208 (shown in FIG. 2) of the bit 25 when the swivel plate 30 is manually rotated away from the bit 25. The motorized friction drive wheel 218 is engaged with the shank 208 of the bit 25 to allow power to be transmitted to the bit 25 by pulling up the spring-loaded pin 40 so the swivel plate 30 is allowed to be pulled by a swivel plate spring 45. The swivel plate spring 45 applies a force that keeps the friction drive wheel 218 in contact with the shank 208 during operation. A spring housing 15 contains two compression springs 216 (shown in FIG. 2) that when magnetically coupled to a bit clamp assembly 20 via spring plungers 504, apply a preload force to a bit clamp bearing 202 as well as a lower bearing 212 (shown in FIG. 2). In one embodiment, bearings 202 and 212 can be of the extended inner race type. FIG. 1 shows the bit 25 inserted into the spindle assembly 10.

As noted above, FIG. 2 shows a cross-section view taken along cut line A-A shown in FIG. 1. The cross-section in FIG. 2 shows the spindle assembly 10 with the friction drive wheel 218 contacting the shank 208 of the bit 25, e.g., in an engaged configuration. The spindle motor 35 can be a brushless direct current (DC) motor. In other embodiments, the spindle motor 35 can be a brushless alternating current (AC) motor. The friction drive wheel 218 is coupled to an output shaft (not shown) of the spindle motor 35 (though the shaft is not visible) in the engaged position. When the friction drive wheel 218 is in a disengaged position there is a gap between the friction drive wheel 218 and the bit shank 208. This disengaged position can facilitate insertion and removal of the bit 25.

When the friction drive wheel 218 is engaged, and in contact with the shank 208 of the bit 25, rotation of the drive wheel 218 causes the bit 25 to rotate. In one embodiment, the drive wheel 218 can be ⅜ inch in diameter and the shank 208 of the bit 25 can be ⅛ inch diameter, causing the bit 25 to rotate three times faster than the drive wheel 218 and reach a rotational speed of around 50,000 revolutions per minute (RPM). Other ratios, and thus other rotational speeds, can be achieved by varying the diameters of the drive wheel 218 and/or shank 208.

In the present embodiment, the drive wheel 218 can be made of aluminum with a urethane coating and fixed to the motor shaft via a set screw. However, in other embodiments, the drive wheel 218 can be made of rubber with an aluminum hub. The drive wheel 218 can be constructed of any other appropriate material having a high coefficient of friction mounted on a hub formed of aluminum, steel, brass, plastics, and the like. Herein, a high coefficient of friction is any coefficient of friction that prevents slippage of the drive wheel 218 while driving the shank 208 of the bit 25 at a determined, or set, full speed of the motor 35.

The spring housing 15 and a spindle block 220 are fastened to a spindle bracket 50 (shown in FIG. 1). This embodiment shows a swivel plate 30 connected to the spindle bracket 50 via a hinge 302 (shown in FIG. 3). The hinge 302 can include a nut and bolt. The nut can be a locknut. The spindle block 220 can be made out of aluminum, stainless steel, or other materials.

The spindle block 220 includes a plurality of bearings, e.g., the lower bearing 212 and an upper bearing 214, arranged coaxially in a vertical direction. With the lower bearing 212 and the upper bearing 214 arranged coaxially, a central bore of the lower bearing 212 and a central bore of the upper bearing 214 are aligned, allowing the shank 208 to extend therethrough. The upper bearing 214 can be an extended inner race bearing.

The bit 25 includes a ring 210 which can be a depth ring, for example formed of a plastic or metal material. The ring 210 can be fixed along the shank 208. In other embodiments, the ring can be a shoulder machined on the shank 208 of the bit 25. By constraining the ring 210 axially between an inner race of the bit clamp bearing 202 and the inner race of a lower bearing 212, the bit 25 is also axially constrained. This arrangement keeps the bit 25 from falling out during milling or being pushed into the spindle block 220 during drilling. Additionally, the ring 210 can be used to preload the bit clamp bearing 202 and the lower bearing 212. The bit clamp assembly 20 itself is held into place by magnetic force. In the present embodiment, the bit clamp assembly 20 includes two clamp magnets 204. In some embodiments, the clamp magnets 204 can each have a surface magnetic field of, for example, 4,022 Gauss. However, the clamp magnets can be selected with other surface field strengths, as well, depending on the particular needs and constraints of individual implementations of the present invention.

When the bit clamp assembly 20 is fixed for operation, the clamp magnets 204 are coupled to respective plunger magnets 206. In some embodiments, the plunger magnets 206 may be of the same type as the clamp magnets 204. The magnetic strength must be strong enough that when the bit clamp assembly 20 is brought near, the plunger magnets 206 drop down towards the clamp magnets 204, overcoming the force of the compression springs 216, and maintain contact therebetween. The compression springs 216 cause a force to be applied to the bit clamp assembly 20, towards the spindle block 220, bringing the clamp bearing 202 towards the lower bearing 212 of the spindle block 220. The strength of the springs 216 controls the preload on the bit clamp bearing 202 and also applies a force to the spindle bearing 212 through the ring 210.

Figure 5:
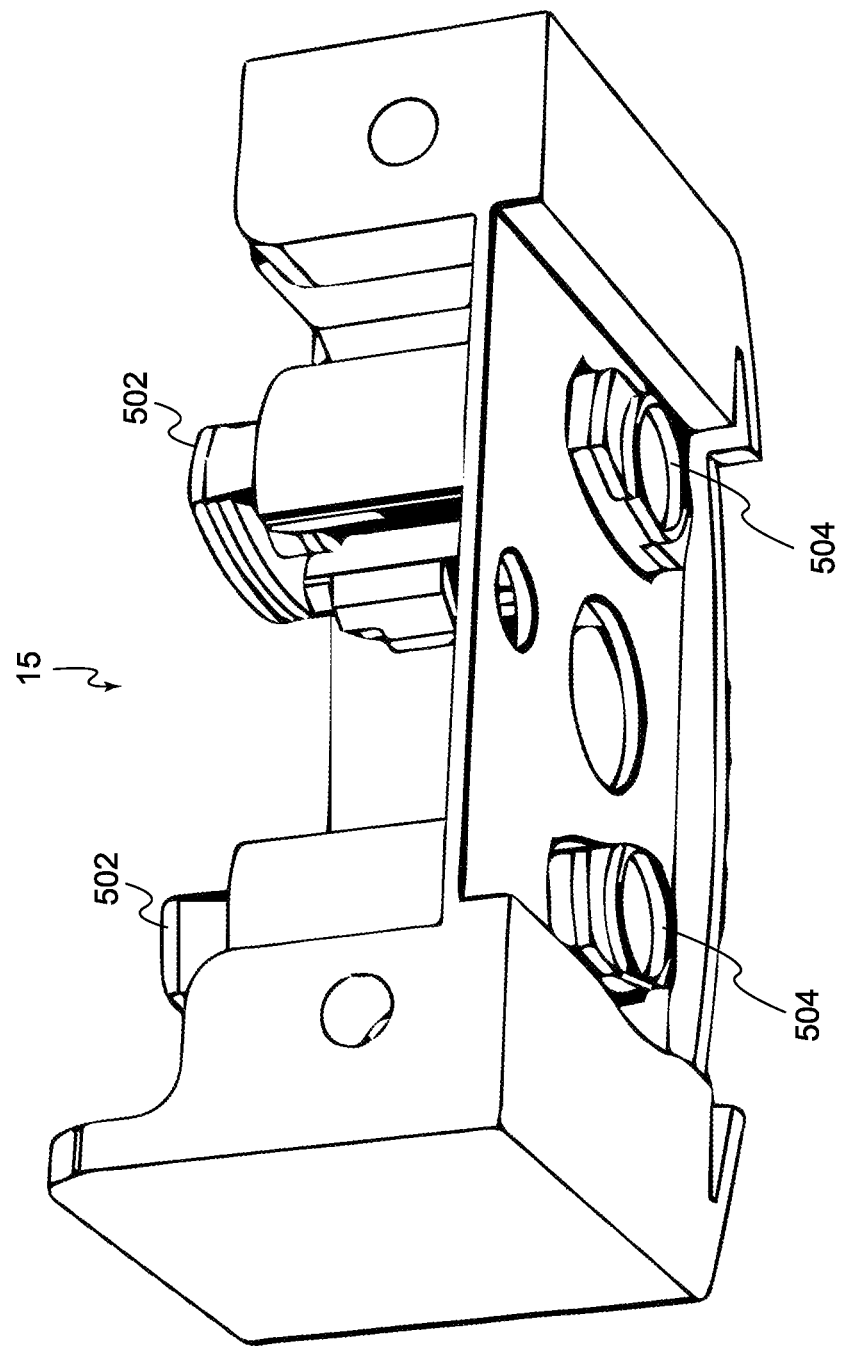
FIG. 5 is a bottom-up oblique view of the spindle spring housing of the spindle assembly of FIG. 1.
Figure 8:
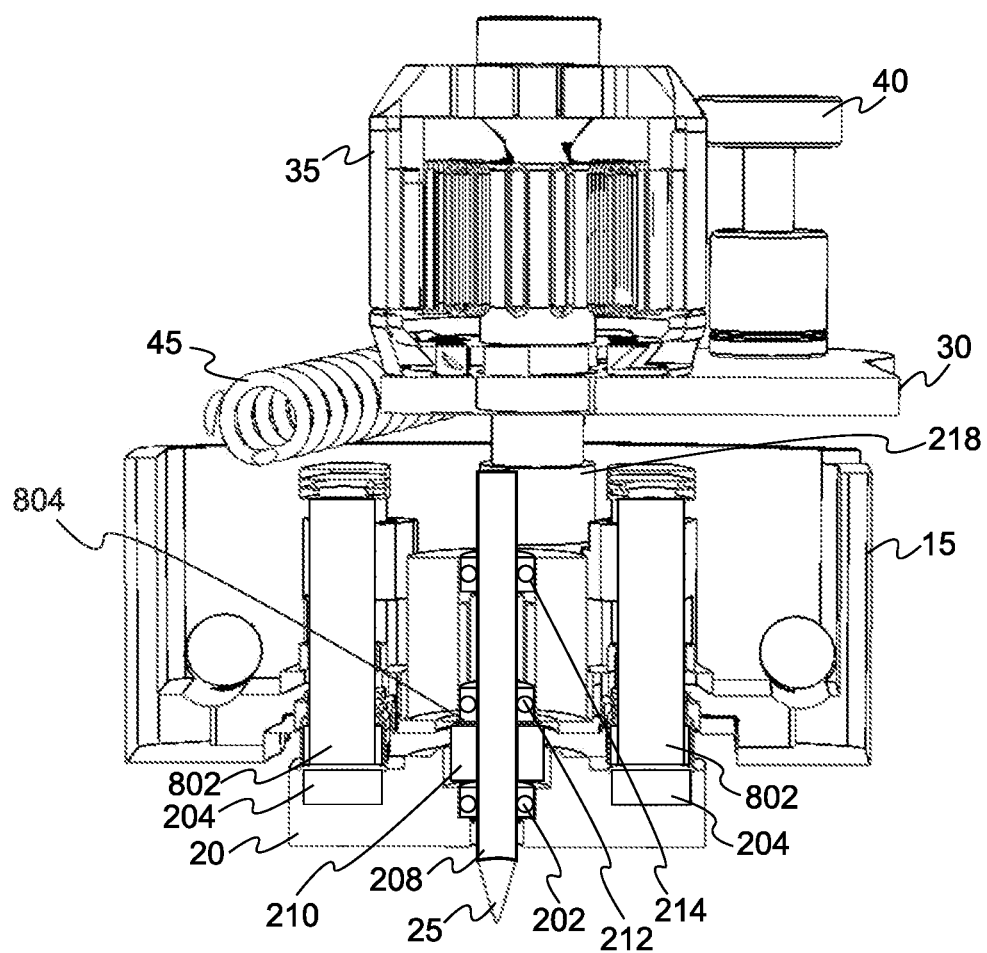
FIG. 8 a cross-sectional view of the spindle assembly, in accordance with another embodiment of the present invention.

Some embodiments can include compression springs 216 with a spring constant of 7.7 lbs./inch which during normal operation, deflect by approximately 0.074", yielding approximately 0.56 lbs. of pull force for each plunger 502 (shown in FIG. 5). Other embodiments can be configured to use extension springs in place of the compression springs 216. In still other embodiments, the compression springs 216 and the plunger magnets 206 can be replaced by electromagnets having an adjustable surface magnetic field strength as shown in the embodiment of FIG. 8 described below.

The plunger magnets 206 can move up and down (parallel to the rotational axis of the bit 25) inside the spring housing 15. When the clamp magnets 204 of the bit clamp assembly 20 is in place and magnetically coupled to the plunger magnets 206, the plunger magnets 206 apply a force (via compression springs 216) that pulls the bit clamp assembly 20 and the clamp bearing 202 towards the spindle block 220 and the lower bearing 212. This force can apply a preloading force to the clamp bearing 202. In the present embodiment, the upper bearing 214 and the lower bearing 212 can have a fixed preload applied, by fixing the outer ring of the upper bearing 214 and the lower bearing 212 to the spindle block 220. Without a permanent spindle shaft, in the present embodiment, an internal cylinder 222 can be used to apply a preload force on respective inner races of the upper bearing 214 and the lower bearing 212. The preload force applied to the inner races of the upper bearing 214 and the lower bearing 212 depends on how much load is placed on the outer rings of the upper bearing 214 and the lower bearing 212 when the outer rings are fixed in place during manufacture of the spindle assembly 10.

In the present embodiment the outer races of the upper bearing 214 and the lower bearing 212 can be fixed using an adhesive. In some embodiments, the outer races of the upper bearing 214 and the lower bearing 212 can be fixed to the spindle block 220 using welds. In still other embodiments, the outer rings of the upper bearing 214 and the lower bearing 212 can be fixed to the spindle block 220 using a compression fitting. In still other embodiments, the outer rings of the upper bearing 214 and the lower bearing 212 can be fixed to the spindle block 220 using retaining clips or retaining rings.

In the present embodiment, the spindle assembly 10 provides quick, tool-less bit changes. The spindle assembly 10 also has bearings that operate under preload which reduces vibration at and increases precision of the bit 25. By rotating the bit 25 directly through the upper bearing 214, the lower bearing 212 and the clamp bearing 202 instead of a collet and spindle shaft, the runout can be kept low, such as a runout of 0.0001 inch, for example.

Figure 4:
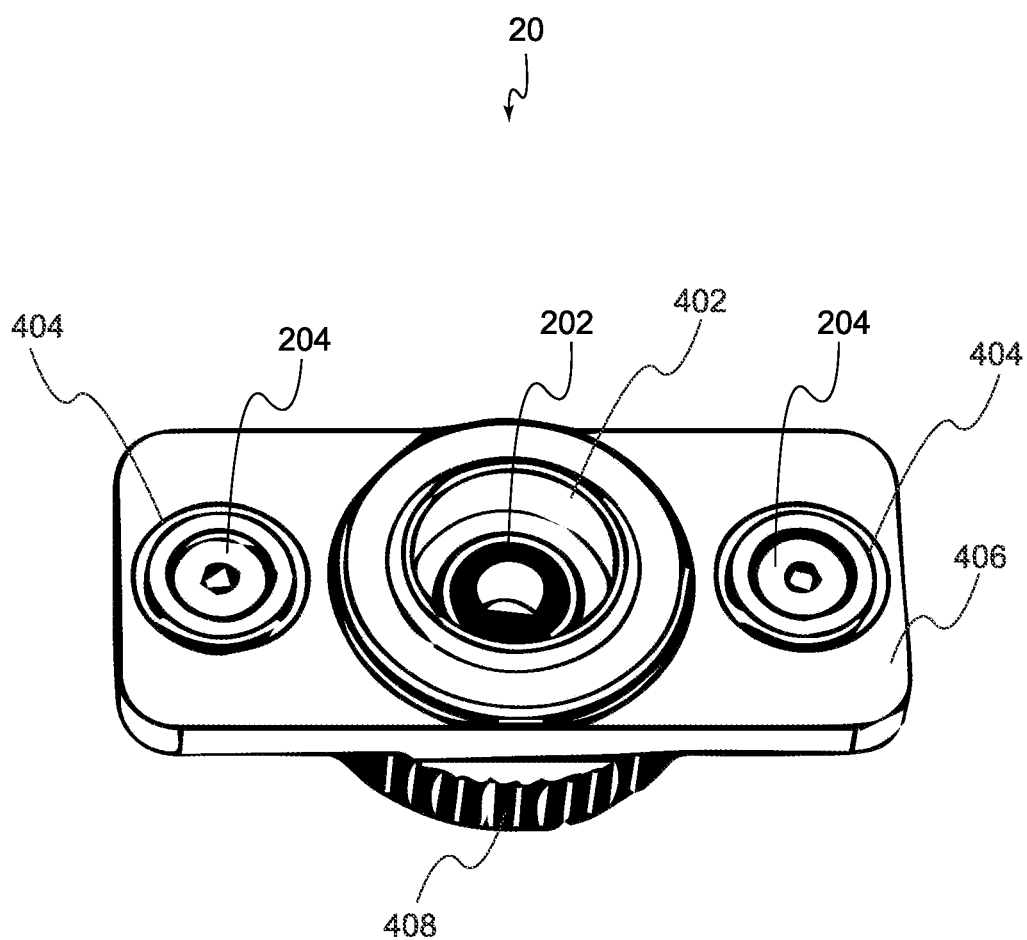
FIG. 4 is a top-down oblique view of the bit clamp assembly of the spindle assembly of FIG. 1.

FIG. 4 is a top-down oblique view of the bit clamp assembly 20. The bit clamp assembly 20 has a plate section 406 and a knurled grip 408. The bit clamp assembly can be constructed from a plastic, such as Acrylonitrile Butadiene Styrene (ABS), acrylic, high density polyethylene (HDPE), polycarbonate, and the like, metals, such as aluminum, brass, steel, alloys, and the like, or a combination of materials. The bit clamp assembly 20 has a central bore 402 formed on a top surface of the plate section 406. The central bore 402 is dimensioned to accommodate the clamp bearing 202 and the ring 210 therein. In some embodiments, the central bore 402 can include a radial shoulder (not shown) such that the clamp bearing 202 rest thereon.

In embodiments where a shoulder is present in the central bore 402, the shoulder is located at a depth within the central bore 402 that holds the clamp bearing 202 at an appropriate position with respect to the lower bearing 212 to facilitate a proper preload force. In some embodiments, the clamp bearing 202 is held within the central bore 402 recessed below the top surface of the plate section 406. The recess depth allows the ring 210 of the bit 25 to press against both the clamp bearing 202 and the lower bearing 212 with a sufficient preload force when the bit clamp assembly 20 is secured to the spring housing 15. The clamp bearing 202 has a through hole sized to accommodate the shank 208 of the bit 25. Preferably, the clamp bearing 202 is selected with a through hole in which the shank 208 fits snugly so that there is little or no lateral movement of the shank 208 within the clamp bearing 202.

In addition to the central bore 402, the bit clamp assembly 20 also has two cavities 404 formed on the top surface of the plate section 406 at opposite sides. The cavities 404 are dimensioned to hold respective clamp magnets 204. In an embodiment, the clamp magnets 204 can be held flush with the top surface of the plate section 406. In other embodiments, the clamp magnets 204 can be recessed below the top surface of the plate section 406. In still other embodiments, the clamp magnets 204 can be raised above the top surface of the plate section 406. The clamp magnets 204 can be secured within the cavity 404 with adhesives, welds, screws, retaining clips, retaining rings, or a combination thereof.

The knurled grip 408 is disposed on the underside of the plate section 406 and provides a gripping surface that facilitates separation of the bit clamp assembly 20 from the spring housing 15 when removing or replacing the bit 25.

FIG. 5 shows an embodiment of the spring housing 15, including the plungers 502. The spring housing 15 and the plungers 502 can be 3D-printed so that the plungers 502 can be created captive to the spring housing 15, and no further assembly may be required except for adhering the plunger magnets 206 and inserting the compression springs 216. The plungers 502 have recesses 504 dimensioned to receive the plunger magnets 206. The compression springs 216 push against top portions of the plungers 502, and thus present an upward, e.g., lifting force on the plungers 502. Therefore, when the plunger magnets 206 are drawn downwards towards the respective clamp magnets 204, the compression springs 216 resist this downward motion.

Figure 6:
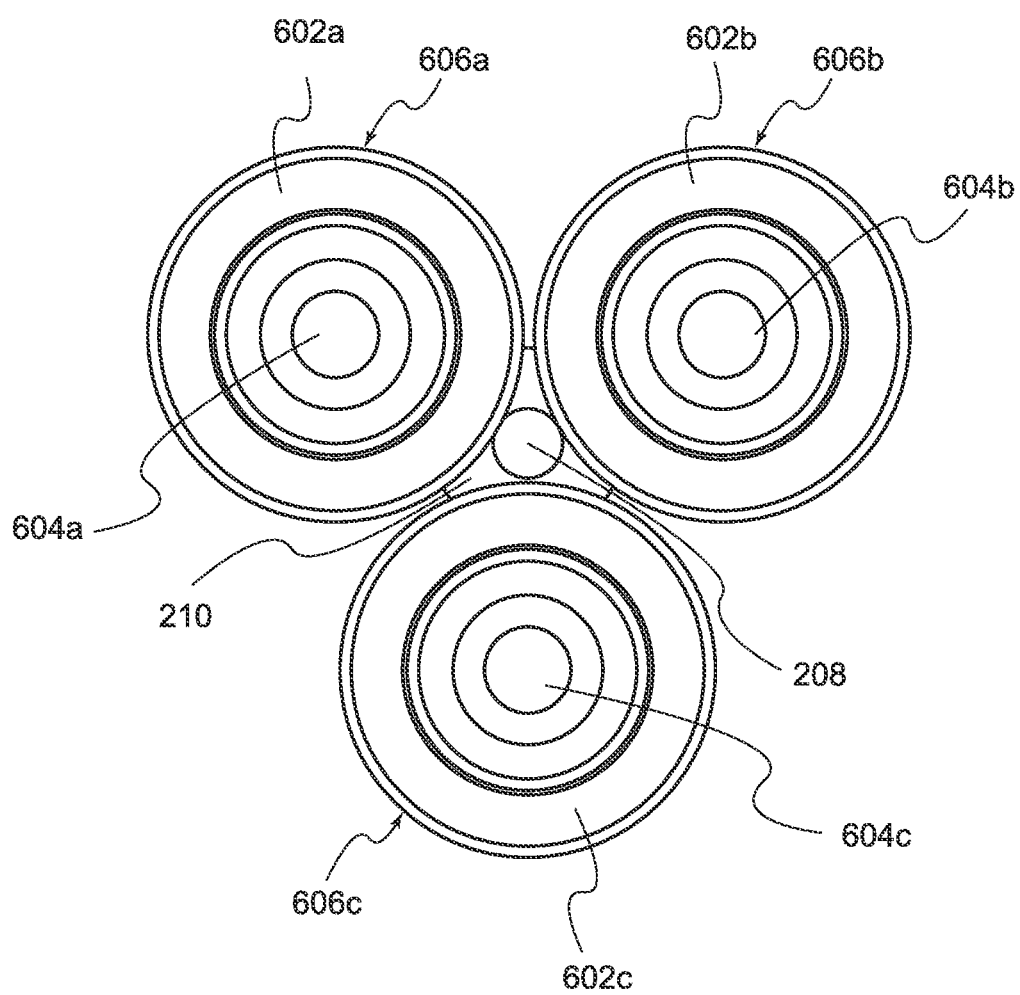
FIG. 6 is a top-down schematic view of a centerless bit holding assembly, in accordance with another embodiment of the present invention.
Figure 7:
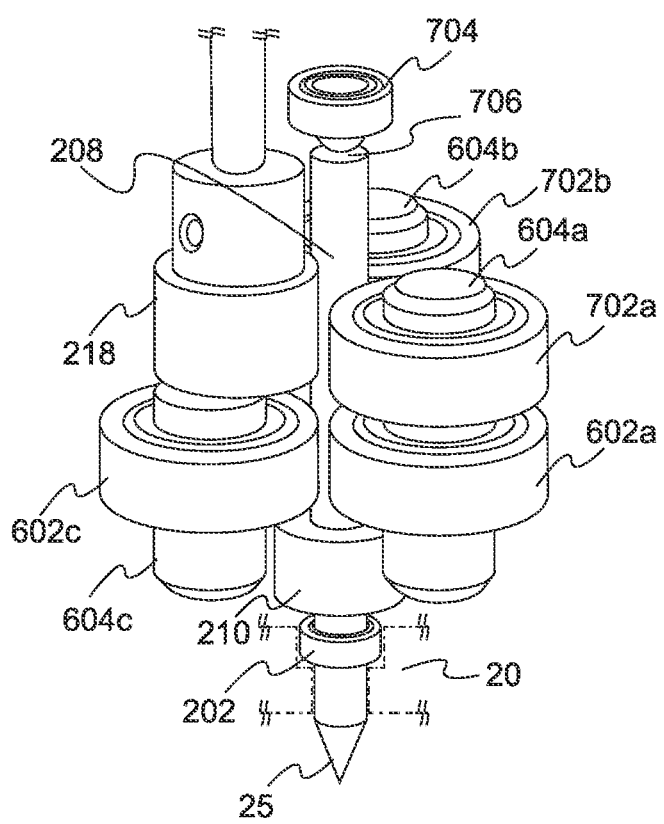
FIG. 7 is a side perspective view of the centerless bit holding assembly of FIG. 6.

FIGS. 6 and 7 show another embodiment of the present invention. In the embodiment shown in FIGS. 1-5, the shank 208 of the bit 25 is inserted through the respective central bores of the lower bearing 212 and the upper bearing 214, thus the lower bearing 212 and the upper bearing 214 hold the bit 25 in place. In the present embodiment, shown in FIGS. 6 and 7, the shank 208 of the bit 25 is held between the intersection of a set of bearings, namely, a first bearing 602a, a second bearing 602b and a third bearing 602c (also collectively identified hereinafter as bearings 602) arranged in a triangular configuration. As shown, the shank 208 is in direct contact with the outer races 606a, 606b and 606c of the respective bearings 602.

Specifically, the first bearing 602a and the second bearing 602b can be mounted on fixed posts 604a and 604b, respectively. The third bearing 602c can be mounted on a moveable post 604c that can move towards and away from the first bearing 602a and the second bearings 602b. The shank 208 of the bit 25 is held by the bearings 602, such that the axis of rotation of the bit 25 corresponds with the centroid of the arrangement of the bearings 602. Movement of the third bearing 602c towards or away from the first bearing 602a and the second bearing 602b changes the position of the centroid of the arrangement and allows accommodation of various diameters of end mill or bit shanks 208. Thus, the present embodiment does not require tight tolerances for shank diameters of the bit 25, as is the case in the embodiments shown in FIGS. 1-5.

Turning to FIG. 7, a gap is present between the three lower bearings 602 and the ring 210. The ring 210 is pressed against the clamp bearing 202 when the bit clamp assembly 20 is mounted to the spring housing 15, thus the ring 210 preloads the clamp bearing 202. A ball transfer unit 704, such as a jewel bearing, for example, can be disposed and configured to contact a top surface 706 of the shank 208. The ball transfer unit 704 constrains upward (axial) movement of the bit 25, while the ring 210 presses against the clamp bearing 202 to constrain downward motion of the bit 25. The ball transfer unit 704 constrains the axial movement of the bit and prevents the ring 210 from contacting the three lower bearings 602. The drive wheel 218 presses the shank 208 against a pair of upper bearings 702a and 702b. The pair of upper bearings 702a and 702b can be mounted on the first post 604a and the second post 604b. In some embodiments, the number of bearings can be reduced by eliminating the first lower bearing 602a, the second lower bearing 602b and the third lower bearing 602c.

Turning to the embodiment shown in FIG. 8, the plungers 502, compression springs 216 and the plunger magnets 206 can be replaced with electromagnets 802. Rather than using the compression springs 216 to statically preload the lower bearing 212, the present embodiment can preload the lower bearing 212 by adjusting the magnetic field of the electromagnets 802. A strain gauge 804 formed as an annulus can be placed between the ring 210 and the lower bearing 212. The strain gauge 804 can provide data indicating the amount of force being applied by the ring 210 onto the lower bearing 212. The data can be used by a controller (not shown) to adjust the field strength of the electromagnet 802 to produce sufficient preloading on the lower bearing 212. In some embodiments, the strain gauge 804 can be placed between the clamp bearing 202 and the ring 210. In other embodiments, alternative sensors can be used in place or in addition to the strain gauge 804 to provide data appropriate for determining an amount of preloading applied to one or more of the bearings.

The bearings described hereinabove can be ball bearings, roller bearings, plain bearings, magnetic bearings (active and/or passive type), fluid bearings, jewel bearings, or a combination thereof. Moreover, the bearings can be, where appropriate, extended inner race (ER) bearings.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A spindle assembly, comprising:
    a friction drive wheel configured to be coupled to an output shaft of a motor, the friction drive wheel being configured and disposed to directly contact a shank of a bit;
    a plurality of bearings configured to contact the shank of the bit;
    a bit clamp assembly including a clamp bearing having a central through-hole dimensioned to accept a lower portion of the shank of the bit, the bit clamp assembly being configured to hold the bit in contact with the plurality of bearings; and
    a housing enclosing the friction drive wheel and the plurality of bearings, the housing including a first magnet and a second magnet configured to magnetically couple with respective magnets disposed on a top surface of the bit clamp assembly, wherein the first magnet and the second magnet are coupled to respective compression springs configured to apply an upward force to securely hold the bit clamp assembly.

2. The spindle assembly as in claim 1, wherein the plurality of bearings includes an upper bearing and a lower bearing arranged coaxially along a vertical direction, a central bore of the upper bearing and a central bore of the lower bearing being aligned and dimensioned to accept the shank of the bit.

3. The spindle assembly as in claim 1, wherein the plurality of bearings includes a first bearing, a second bearing and a third bearing arranged in a triangular configuration and forming a central void therebetween, the plurality of bearings being configured to contact the shank of the bit along outer races of the first bearing, the second bearing, and the third bearing.

4. The spindle assembly as in claim 3, wherein the first bearing and the second bearing are mounted on fixed posts, and the third bearing is mounted on a moveable post.

5. The spindle assembly as in claim 1, wherein the motor is a direct current (DC) motor.

6. The spindle assembly as in claim 5, wherein the DC motor is a brushless DC motor.

7. The spindle assembly as in claim 1, wherein the motor is an alternating current (AC) motor.

8. The spindle assembly as in claim 1, wherein the bit clamp assembly is configured to axially constrain the bit by trapping a ring extending outward from the shank of the bit, the ring being trapped between the clamp bearing and a surface of at least one of the plurality of bearings.

9. The spindle assembly as in claim 8, wherein the ring is a depth ring disposed on the shank of the bit, the depth ring being formed of a material selected from the group consisting of: metal and plastic.

10. The spindle assembly as in claim 8, wherein the ring is a shoulder integrally formed on the surface of the shank of the bit.

11. A spindle assembly, comprising:
a friction drive wheel configured to be coupled to an output shaft of a motor, the friction drive wheel being configured and disposed to directly contact a shank of a bit;
a plurality of bearings configured to contact the shank of the bit; and
a bit clamp assembly including a clamp bearing having a central through-hole dimensioned to accept a lower portion of the shank of the bit, the bit clamp assembly being configured to hold the bit in contact with the plurality of bearings, and the bit clamp assembly being further configured to axially constrain the bit by trapping a ring extending outward from the shank of the bit, the ring being trapped between the clamp bearing and a surface of at least one of the plurality of bearings,
wherein the ring is a depth ring disposed on the shank of the bit, the depth ring being formed of a material selected from the group consisting of metal and plastic.

12. The spindle assembly as in claim 11, wherein the plurality of bearings includes an upper bearing and a lower bearing arranged coaxially along a vertical direction, a central bore of the upper bearing and a central bore of the lower bearing being aligned and dimensioned to accept the shank of the bit.

13. The spindle assembly as in claim 11, wherein the plurality of bearings includes a first bearing, a second bearing and a third bearing arranged in a triangular configuration and forming a central void therebetween, the plurality of bearings being configured to contact the shank of the bit along outer races of the first bearing, the second bearing, and the third bearing.

14. The spindle assembly as in claim 11, further comprising a housing enclosing the friction drive wheel and the plurality of bearings, the housing including a first magnet and a second magnet configured to magnetically couple with respective magnets disposed on a top surface of the bit clamp assembly.

15. The spindle assembly as in claim 14, wherein the first magnet and the second magnet are coupled to respective compression springs configured to apply an upward force to securely hold the bit clamp assembly.

16. The spindle assembly as in claim 14, wherein the first magnet and second magnet are electromagnets configured to apply an upward force to securely hold the bit clamp assembly.

17. The spindle assembly as in claim 16, further comprising a controller and a strain gauge sensor, the controller configured to vary a magnetic field of the electromagnets to adjust a pre-loading force on the bit using feedback from the strain gauge sensor.

* * * * *